United States Patent
Zeng et al.

(10) Patent No.: US 10,185,167 B2
(45) Date of Patent: Jan. 22, 2019

(54) BACKLIGHT ASSEMBLY AND LIQUID CRYSTAL DISPLAY ASSEMBLY

(71) Applicant: WUHAN CHINA STAR OPTOELECTRONICS TECHNOLOGY CO., LTD, Wuhan, Hubei (CN)

(72) Inventors: Jie Zeng, Hubei (CN); Xia Zhang, Hubei (CN); Zhenzhen Zhang, Hubei (CN); Xiaoling Li, Hubei (CN); Yingbo Zheng, Hubei (CN); Xuan Qiu, Hubei (CN)

(73) Assignee: WUHAN CHINA STAR OPTOELECTRONICS TECHNOLOGY CO., LTD., Wuhan, Hubei (CN)

( * ) Notice: Subject to any disclaimer, the term of this patent is extended or adjusted under 35 U.S.C. 154(b) by 0 days.

(21) Appl. No.: 15/578,537

(22) PCT Filed: Jul. 6, 2017

(86) PCT No.: PCT/CN2017/092116
§ 371 (c)(1),
(2) Date: Nov. 30, 2017

(65) Prior Publication Data
US 2018/0373086 A1 Dec. 27, 2018

(30) Foreign Application Priority Data
Jun. 23, 2017 (CN) .......................... 2017 1 0487235

(51) Int. Cl.
*F21V 8/00* (2006.01)
*G02F 1/1333* (2006.01)
*G02F 1/1335* (2006.01)

(52) U.S. Cl.
CPC ..... *G02F 1/133308* (2013.01); *G02B 6/0055* (2013.01); *G02B 6/0085* (2013.01);
(Continued)

(58) Field of Classification Search
CPC ............ G02F 1/133308; G02B 6/0055; G02B 6/0085
See application file for complete search history.

(56) References Cited

U.S. PATENT DOCUMENTS

2014/0240639 A1 8/2014 Jung
2014/0340875 A1* 11/2014 Hayashi ............ G02F 1/133308
362/97.1

FOREIGN PATENT DOCUMENTS

CN 101561097 10/2009
CN 205579339 9/2016
(Continued)

*Primary Examiner* — Lucy P Chien
(74) *Attorney, Agent, or Firm* — Mintz Levin Cohn Ferris Glovsky and Popeo, P.C.; Kongsik Kim

(57) ABSTRACT

The present invention provides a backlight assembly which includes a plastic frame, the plastic frame, a light guide plate, a light bar and an optical diaphragm group, a side surface of the plastic frame deviating from the reflective sheet is provided with a double-sided adhesive, at least one side frame of the plastic frame is provided with a groove which is disposed at a side surface of the plastic frame opposite to the double-sided adhesive; the double-sided adhesive includes a conductive heat dissipation layer and a double-sided adhesive layer, and a first metal sheet is disposed on a double-sided adhesive layer, located on the groove and contacts the optical diaphragm group and the conductive heat dissipation layer, respectively. The present invention further provides a liquid crystal display assembly.

18 Claims, 8 Drawing Sheets

(52) U.S. Cl.
CPC ..... *G02B 6/0088* (2013.01); *G02F 1/133553* (2013.01); *G02F 1/133608* (2013.01); *G02F 2001/133314* (2013.01); *G02F 2202/28* (2013.01)

(56) References Cited

FOREIGN PATENT DOCUMENTS

| | | |
|---|---|---|
| CN | 206020876 | 3/2017 |
| CN | 106842696 A | 6/2017 |
| WO | 2012050052 A1 | 4/2012 |

\* cited by examiner

US 10,185,167 B2

BACKLIGHT ASSEMBLY AND LIQUID CRYSTAL DISPLAY ASSEMBLY

CROSS-REFERENCES TO RELATED APPLICATIONS

This application is a U.S. national phase application, pursuant to 35 U.S.C. § 371, of PCT/CN2017/092116, filed Jul. 6, 2017, designating the United States, which claims priority to Chinese Application No. 201710487235.1, filed Jun. 23, 2017. The entire contents of the aforementioned patent applications are incorporated herein by this reference.

TECHNICAL FIELD

The present invention relates to a display panel technique, particularly to a backlight assembly and a liquid crystal display assembly.

BACKGROUND ART

At present, a liquid crystal display device, as a display component of an electronic apparatus, has been widely applied in various electronic products, and a backlight assembly is an important component in the liquid crystal display device.

Generally, a small-and-medium-sized backlight assembly (which is different from a large-sized one) includes: a plastic frame, a reflective sheet, a light guide plate, an optical diaphragm group, a light bar and a shading tape (a rectangle shaped gel), a flexible circuit board of the light bar is fixed on the plastic frame via the shading tape, the fixing means thereof is fixing to one side of the shading tape opposite to the light guide plate, and the optical diaphragm group is adhered to the plastic frame via the shading tape; and a display panel is fixed on the plastic frame via the shading tape while fixing with the display panel. Static electricity is easily generated due to tearing a protection film while assembling the optical diaphragm group, which causes the optical diaphragms to be absorbed together, such that the backlight assembly will have an optical problem such as Newton ring.

SUMMARY

In order to overcome defects in the prior art, the present disclosure provides a backlight assembly and a liquid crystal display assembly which makes the backlight assembly antistatic and prevents generation of Newton ring.

The present disclosure provides a backlight assembly which includes a plastic frame, a reflective sheet disposed at a side surface of the plastic frame, a light guide plate disposed in the plastic frame, a light bar disposed in the plastic frame and opposites to a side of the light guide plate and an optical diaphragm group disposed on a side surface of the light guide plate deviating from the reflective sheet, a side surface of the plastic frame deviating from the reflective sheet is provided with a double-sided adhesive, at least one side frame of the plastic frame is provided with a groove which is disposed at a side surface of the plastic frame opposite to the double-sided adhesive, and the groove passes through an internal side and an external side of the frame of the plastic frame and a side surface of the frame of the plastic frame opposite to the double-sided adhesive; the double-sided adhesive includes a conductive heat dissipation layer for conducting static and dissipating heat and a double-sided adhesive layer disposed on both side surfaces of the conductive heat dissipation layer, a first metal sheet is disposed on a double-sided adhesive layer opposite to the plastic frame, the first metal sheet corresponds to the position of the groove and contacts the optical diaphragm group and the conductive heat dissipation layer, respectively.

Furthermore, a protrusion part is disposed on an edge of the optical diaphragm group corresponding to the position of the groove, wherein the protrusion part is embedded into the groove.

Furthermore, a first hole is disposed on a double-sided adhesive layer opposite to the plastic frame which is at the first metal sheet, the first metal sheet is disposed in the first hole, an internal surface of the first metal sheet contacts the conductive heat dissipation layer, and a first exposed part is formed at an external surface of the first metal sheet and contacts the protrusion part.

Furthermore, a side of the double-sided adhesive at the light bar is provided with a widen part.

Furthermore, through holes are disposed on the widen part corresponding to the positions of lamp beads of the light bar, the light bar puts the light beads into the plastic frame via the through holes from a side surface of the double-sided adhesive deviating from the plastic frame, and a flexible circuit board of the light bar is fitted into a side surface of the widen part deviating from the plastic frame.

Furthermore, a second metal sheet is disposed on the double-sided adhesive layer deviating from the plastic frame, the second metal sheet is disposed on the widen part corresponding to the position of the flexible circuit board and contacts the conductive heat dissipation layer and the flexible circuit board, respectively.

Furthermore, a second hole is disposed on a double-sided adhesive layer deviating from the plastic frame which is at the second metal sheet, the second metal sheet is disposed in the second hole, an internal surface of the second metal sheet contacts the conductive heat dissipation layer, and a second exposed part is formed at an external surface of the second metal sheet and contacts the flexible circuit board.

Furthermore, the conductive heat dissipation layer is a graphite sheet.

Furthermore, the first metal sheet and the second metal sheet are copper foil.

The present disclosure also provides a liquid crystal display assembly including the backlight assembly.

Compared with the prior art, the present invention can conduct static away through the metal sheet and the conductive heat dissipation layer when the optical diaphragm group generates static and thereby realizing an antistatic effect and preventing generation of Newton ring by disposing the groove on the plastic frame, disposing the conductive heat dissipation layer in the double-sided adhesive, disposing the first metal sheet on the double-sided adhesive and making the first metal sheet contact the optical diaphragm group and the conductive heat dissipation layer.

BRIEF DESCRIPTION OF THE DRAWINGS

FIG. 4-B is a partial cross-section diagram of a double-sided adhesive of the present invention;

FIG. 4-C is a schematic diagram of a connection of a double-sided adhesive and an optical diaphragm group of the present invention;

DETAILED DESCRIPTION OF EXEMPLARY EMBODIMENTS

Hereinafter, the present invention will be further described in detail with reference to the figures and embodiments.

Figure 1:
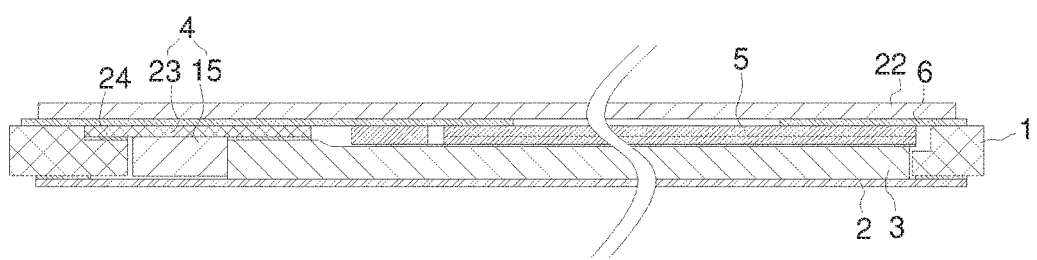
FIG. 1 is a structural schematic diagram of a first assembling means of the backlight assembly of the present invention.
Figure 2:
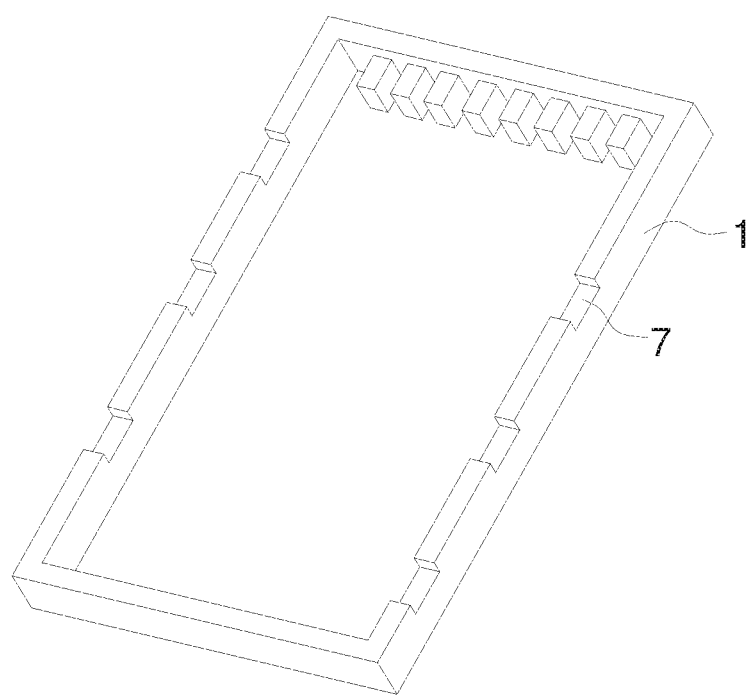
FIG. 2 is a structural schematic diagram of a plastic frame of the present invention.
Figure 4A:
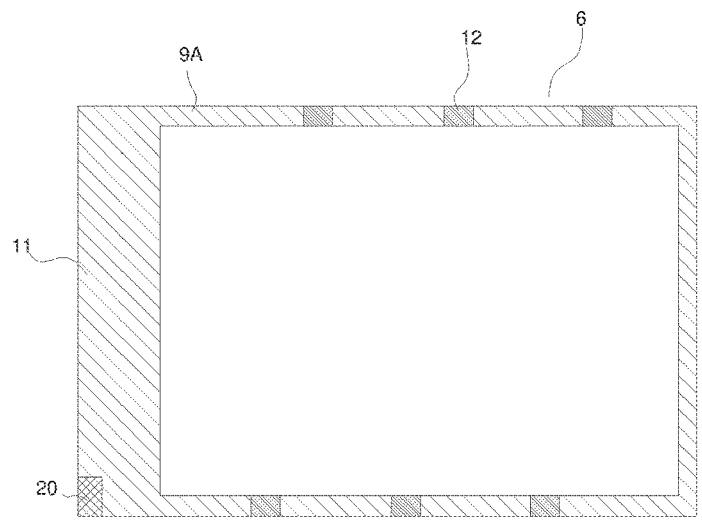
FIG. 4-A is an external structural schematic diagram of a double-sided adhesive of the present invention.

As illustrated in FIGS. 1, 2 and 4A, the backlight assembly of the present invention includes a plastic frame 1, a reflective sheet 2 disposed at a side surface of the plastic frame 1, a light guide plate 3 disposed in the plastic frame 1, a light bar 4 disposed in the plastic frame 1 and opposites to a side of the light guide plate 3 and an optical diaphragm group 5 disposed on a side surface of the light guide plate 3 deviating from the reflective sheet 2. A side surface of the plastic frame 1 deviating from the reflective sheet 2 is provided with a double-sided adhesive 6, which surrounds an edge of the plastic frame 1 by a circle. Lamp beads 15 of the light bar 4 are disposed to be opposite to the reflective sheet 2. At least one side frame of the plastic frame 1 is provided with a groove 7 (as illustrated in FIG. 2), which is disposed on a side surface of the plastic frame 1 opposite to the double-sided adhesive 6 and passes through an internal side and an external side of the frame of the plastic frame 1 and a side surface of the frame of the plastic frame opposite to the double-sided adhesive 6. The double-sided adhesive 6 includes a conductive heat dissipation layer 8 for conducting static and dissipating heat and a double-sided adhesive layer 9 disposed on both side surfaces of the conductive heat dissipation layer 8 (as illustrated in FIG. 4-2). The conductive heat dissipation layer 8 is a sheet structure made of graphite materials, that is, graphite sheets. For easy understanding, hereinafter, the two double-sided adhesive layers 9 in the double-sided adhesive 6 are defined to be a first double-sided adhesive layer 9A that is opposite to the plastic frame 1 and a second double-sided adhesive layer 9B that is deviating from the plastic frame 1, respectively.

the first double-sided adhesive layer 9A is provided with a first metal sheet 12 which is copper foil, corresponds to the position of the groove 7 and contacts the optical diaphragm group 5 and the conductive heat dissipation layer 8, respectively, thereby conducting static generated by the optical diaphragm group 5 to outside of the backlight assembly from the groove 7 via the first metal sheet 12 and the conductive heat dissipation layer 8 and preventing generation of Newton ring environment.

As illustrated in FIG. 1, in the present invention, the optical diaphragm group 5 is disposed in the plastic frame 1 and between the light guide plate 3 and the double-sided adhesive 6.

Figure 3A:
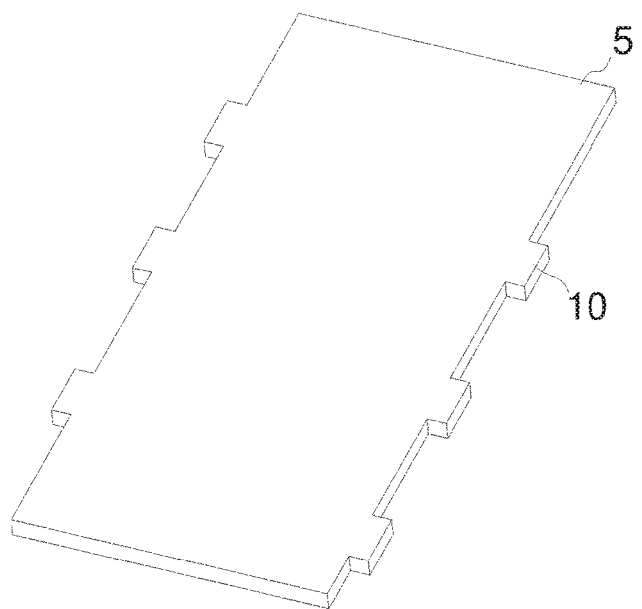
FIG. 3A is a structural schematic diagram of an optical diaphragm group of the present invention.
Figure 3B:
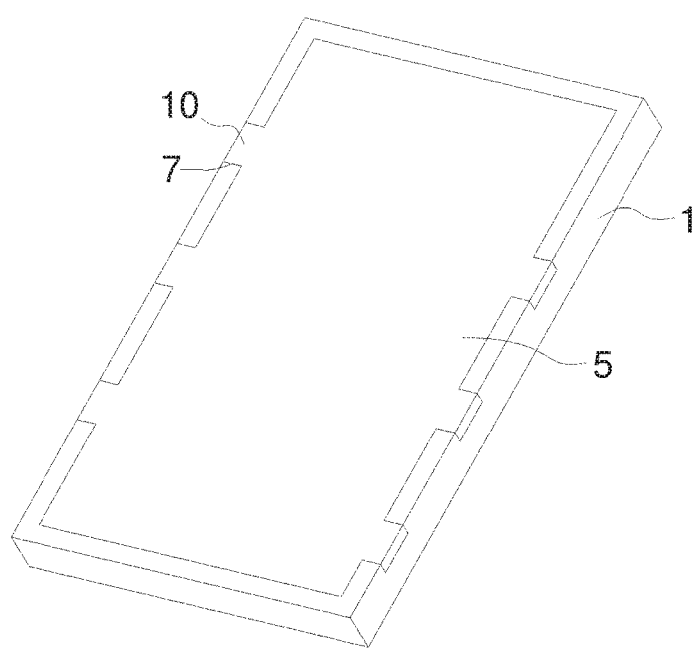
FIG. 3-B is an assembling diagram of an optical diaphragm group and a plastic frame of the present invention.

As illustrated in FIGS. 3A and 3B, the portion of the edge of the optical diaphragm group 5 corresponding to the position of the groove 7 is provided with a protrusion part 10, which is embedded into the groove 7 and of which the shape matches the shape of the groove 7, thereby preventing the optical diaphragm group 5 swaying back and forth after being embedded into the groove 7, which can implement a fool-proof function as well.

Particularly, as illustrated in FIG. 2, the grooves 7 are disposed on long sides of both sides of the plastic frame 1 perpendicular to the light bar 4 and disposed with intervals, respectively. The grooves 7 on long sides of both sides are alternatively disposed, respectively, and the protrusion part 10 is disposed to correspond to the groove 7 accordingly. The number of the grooves 7 at each side is disposed to be three.

As illustrated in FIG. 4A, the portion of the first double-sided adhesive layer 9A which is at the first metal sheet 12 is provided with a first hole 13 in which the first metal sheet 12 is enabled to be disposed. The first metal sheet 12 contacts the conductive heat dissipation layer 8. A first exposed part 14 is formed at an external surface of the first metal sheet 12 and contacts the protrusion part 10 (as illustrated in FIG. 4C), and the area of the first metal sheet 12 contacting the protrusion part 10 increases.

In the present invention, as illustrated in FIG. 4A, the double-sided adhesive 6 is further provided with a contact part 20 where the conductive heat dissipation layer 8 contacts the liquid crystal display device. The contact part 20 may be disposed according to actual situations of the liquid crystal display device. The position of the contact part 20 is not particularly defined here, as long as the static can be conducted out.

Figure 5:
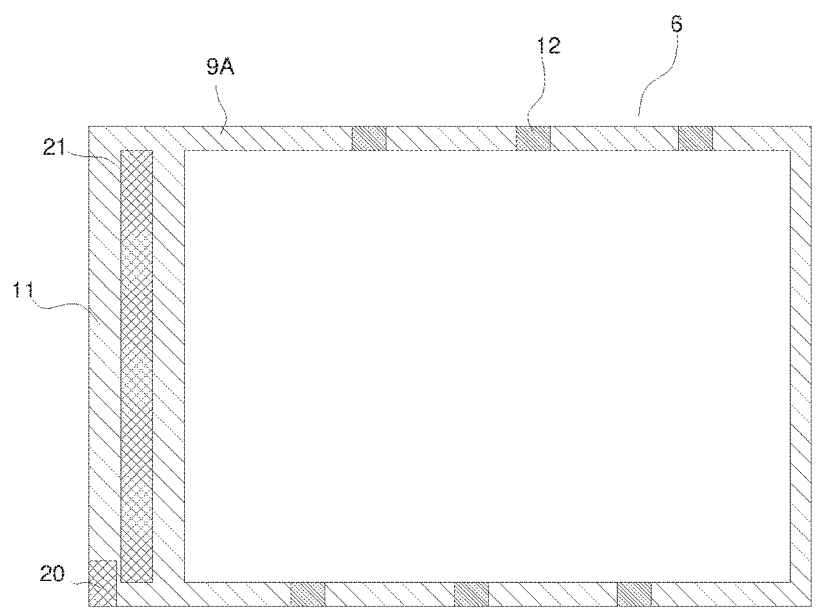
FIG. 5 is an external structural schematic diagram of a first double-sided adhesive of the present invention.

As illustrated in FIGS. 1 and 5, the light bar 4 in the backlight assembly of embodiment 1 is disposed on a side surface of the double-sided adhesive 6 opposite to the plastic frame 1.

Figure 4B:
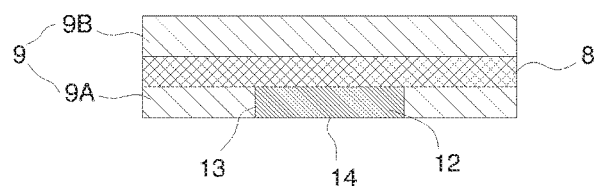
Figure 4C:
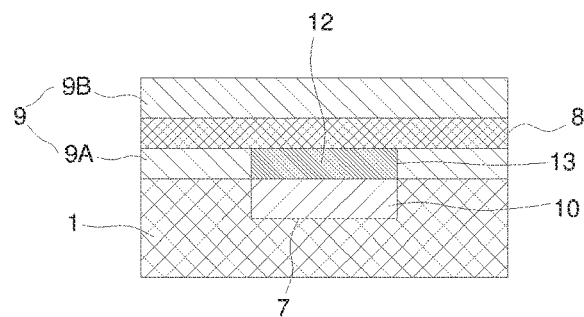

The portion of the first double-sided adhesive layer 9A which is at the first metal sheet 12 is provided with a first hole 13 (as illustrated in FIG. 4B), in which the first metal sheet 12 is enabled to be disposed. The first metal sheet 12 contacts the conductive heat dissipation layer 8. A first exposed part 14 is formed at an external surface of the first metal sheet 12 and contacts the protrusion part 10 (as illustrated in FIG. 4C), and the area of the first metal sheet 12 contacting the protrusion part 10 increases. A side of the double-sided adhesive 6 which is at the light bar 4 is provided with a widen part 11, of which the width is larger than the width of the rest part of the double-sided adhesive 6, and the light bar 4 is fixed through the widen part 11.

As illustrated in FIG. 5, in the embodiment 1, the double-sided adhesive 6 may be disposed with a hollow part 21 on the first double-sided adhesive layer 9A which is at the widen part 11, to enable the conductive heat dissipation layer 8 at the hollow part 21 to be exposed. The heat generated by the light bar 4 and static generated by the flexible circuit board are absorbed and conducted through the conductive heat dissipation layer 8, which is implemented by making the flexible circuit board 23 of the light bar 4 contact the part of the conductive heat dissipation layer 8 which is at the hollow part 21, thereby reducing the temperature of the light bar 4 and eliminating static and further preventing generation of Newton ring phenomenon.

In embodiment 1, a hole edge within the frame at a side surface of the plastic frame 1 opposite to the double-sided adhesive 6 is provided with a sinking step 24, which is disposed to be adjacent to the light bar 4 so as to be used for carrying the light bar 4 and the optical diaphragm group 5. Correspondingly, the height at a side of the light guide plate 3 adjacent to the light bar 4 is equal to the height where the step surface of the sinking step 24 is. Both sides of the flexible circuit board 23 of the light bar 4 are seated on the sinking step 24 and a side edge of the light guide plate 3 adjacent to the sinking step 24, respectively.

Figure 6:
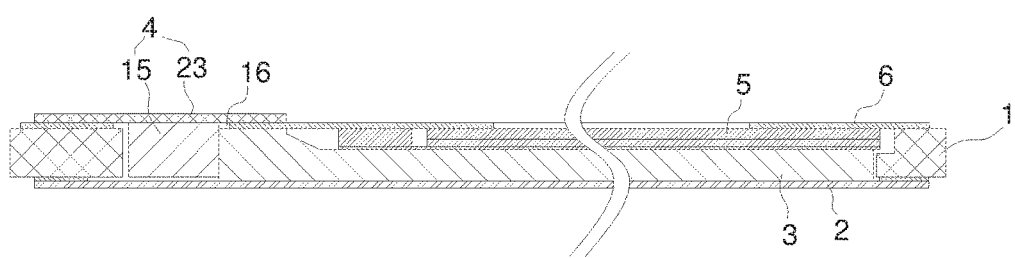
FIG. 6 is a structural schematic diagram of a second assembling means of the backlight assembly of the present invention.
Figure 7:
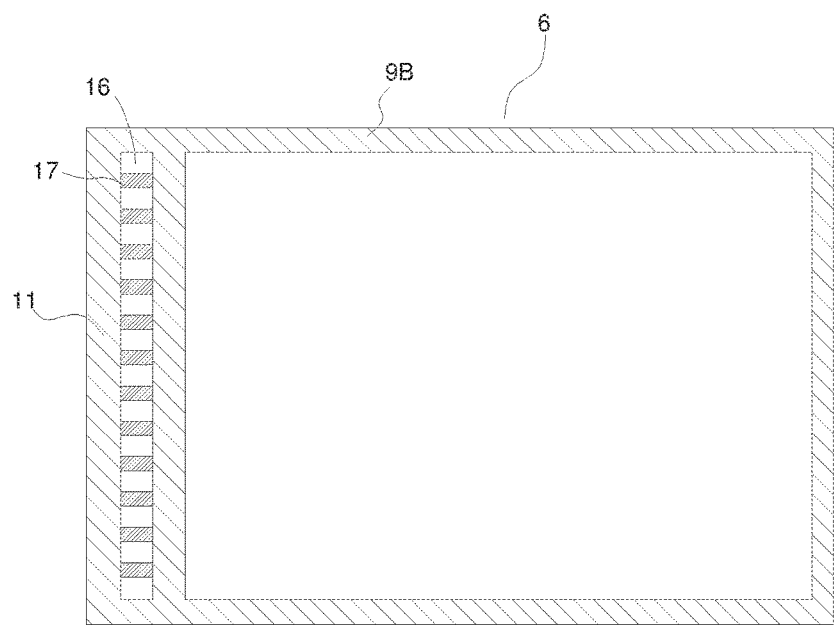
FIG. 7 is an external structural schematic diagram of a second double-sided adhesive of the backlight assembly of the present invention.
Figure 8:
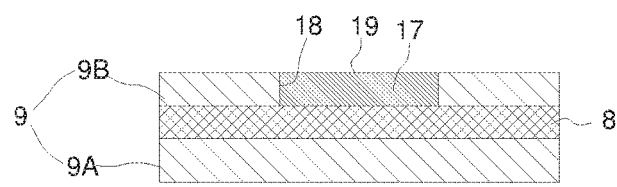
FIG. 8 is a cross-section diagram of a second double-sided adhesive of the backlight assembly of the present invention.

As illustrated in FIGS. 6, 7 and 8, the light bar 4 in the backlight assembly of embodiment 2 is disposed on a side surface of the double-sided adhesive 6 deviating from the plastic frame 1. A side of the double-sided adhesive 6 which is at the light bar 4 is provided with a widen part 11, of which the width is larger than the width of the rest part of the double-sided adhesive 6, and the light bar 4 is fixed through the widen part 11.

The portion of the first double-sided adhesive layer 9A which is at the first metal sheet 12 is provided with a first hole 13 (as illustrated in FIG. 4B), in which the first metal sheet 12 is enabled to be disposed. The first metal sheet 12 contacts the conductive heat dissipation layer 8. A first exposed part 14 is formed at an external surface of the first metal sheet 12 and contacts the protrusion part 10 (as illustrated in FIG. 4C), and the area of the first metal sheet 12 contacting the protrusion part 10 increases.

As illustrated in FIG. 7, through holes 16 corresponding to the positions of lamp beads 15 of the light bar 4 are further disposed on the widen part 11 in embodiment 2. The light bar 4 puts the light beads 15 into the plastic frame 1 via the through holes 16 from a side surface of the double-sided adhesive 6 deviating from the plastic frame 1, and a flexible circuit board 23 of the light bar 4 is fitted into a side surface of the widen part 11 deviating from the plastic frame 1. The heat of the lamp beads 15 can be dissipated through the conductive heat dissipation layer 8 by the contact of the light beads 15 and the conductive heat dissipation layer 8 in the through holes 16.

As illustrated in FIG. 8, in the embodiment 2, the second double-sided adhesive layer 9B is provided with a second metal sheet 17, which is disposed at the portion of the widen part 11 which corresponds to the position of the flexible circuit board 23. The second metal sheet 17 contacts the conductive heat dissipation layer 8 and the flexible circuit board 23, respectively. Particularly, a second hole 18 is disposed on the portion of the second double-sided adhesive layer 9B which is at the second metal sheet 17, and the second metal sheet 17 is enabled to be disposed in the second hole 18. The internal surface of the second metal sheet 17 contacts the conductive heat dissipation layer 8, a second exposed part 19 is formed at an external surface of the second metal sheet 17, the second exposed part 19 contacts the flexible circuit board 23, which implements absorbing and conducting heat generated by the light bar 4 and static generated by the flexible circuit board through the second metal sheet 17 and the conductive heat dissipation layer 8, thereby reducing the temperature of the light bar 4 and eliminating static so as to further prevent generation of Newton ring phenomenon.

In the present invention, the first metal sheet 12 may be disposed at least at a position of the double-sided adhesive 6 where is at one of the grooves 7 and may also be disposed at the positions of all of the grooves 7 according to needs, and particular definitions are not made here. The second metal sheet 17 may also be disposed to be one or more at the portion of the widen part 11 corresponding to the position of the flexible circuit board 23 according to needs, and particular definitions are not made here.

As illustrated in FIG. 1, the liquid crystal display assembly of the present invention includes the backlight assembly disclosed by embodiment 1 or embodiment 2, the details thereof are not presented here, and a panel 22 is adhered and fixed to a side surface of the plastic frame 1 deviating from the reflective sheet 2 via the double-sided adhesive 6.

Although the present invention is described with reference to the special exemplary embodiment, while those skilled in the art will understand: various changes in form and details may be made therein without departing from the spirit and scope of the invention as defined by the appended claims and its equivalents.

The invention claimed is:

1. A backlight assembly, comprising a plastic frame, a reflective sheet disposed at a side surface of the plastic frame, a light guide plate disposed in the plastic frame, a light bar disposed in the plastic frame and opposites to a side of the light guide plate and an optical diaphragm group disposed on a side surface of the light guide plate deviating from the reflective sheet, wherein a side surface of the plastic frame deviating from the reflective sheet is provided with a double-sided adhesive, at least one side frame of the plastic frame is provided with a groove which is disposed at a side surface of the plastic frame opposite to the double-sided adhesive and passes through an internal side and an external side of the frame of the plastic frame and a side surface of the frame of the plastic frame opposite to the double-sided adhesive; the double-sided adhesive comprises a conductive heat dissipation layer for conducting static and dissipating heat and a double-sided adhesive layer disposed on both side surfaces of the conductive heat dissipation layer, and a first metal sheet is disposed on a double-sided adhesive layer opposite to the plastic frame, the first metal sheet corresponds to the position of the groove and contacts the optical diaphragm group and the conductive heat dissipation layer, respectively.

2. The backlight assembly of claim 1, wherein a protrusion part is disposed on an edge of the optical diaphragm group corresponding to the position of the groove, and the protrusion part is embedded into the groove.

3. The backlight assembly of claim 1, wherein a first hole is disposed on a double-sided adhesive layer opposite to the plastic frame which is at the first metal sheet, the first metal sheet is disposed in the first hole, an internal surface of the first metal sheet contacts the conductive heat dissipation layer, and a first exposed part is formed at an external surface of the first metal sheet and contacts the protrusion part.

4. The backlight assembly of claim 1, wherein a side of the double-sided adhesive at the light bar is provided with a widen part.

5. The backlight assembly of claim 4, wherein through holes are disposed on the widen part corresponding to the positions of lamp beads of the light bar, the light bar puts the light beads into the plastic frame via the through holes from a side surface of the double-sided adhesive deviating from the plastic frame, and a flexible circuit board of the light bar is fitted into a side surface of the widen part deviating from the plastic frame.

6. The backlight assembly of claim 5, wherein a second metal sheet is disposed on the double-sided adhesive layer deviating from the plastic frame, the second metal sheet is disposed on the widen part corresponding to the position of the flexible circuit board and contacts the conductive heat dissipation layer and the flexible circuit board, respectively.

7. The backlight assembly of claim 6, wherein a second hole is disposed on a double-sided adhesive layer deviating from the plastic frame which is at the second metal sheet, the second metal sheet is disposed in the second hole, an internal surface of the second metal sheet contacts the conductive heat dissipation layer, and a second exposed part is formed at an external surface of the second metal sheet and contacts the flexible circuit board.

8. The backlight assembly of claim 1, wherein the conductive heat dissipation layer is a graphite sheet.

9. The backlight assembly of claim 7, wherein the first metal sheet and the second metal sheet are copper foil.

10. A liquid crystal display assembly, comprising: a backlight assembly which comprises a plastic frame, a reflective sheet disposed at a side surface of the plastic frame, a light guide plate disposed in the plastic frame, a light bar disposed in the plastic frame and opposites to a side of the light guide plate and an optical diaphragm group disposed on a side surface of the light guide plate deviating from the reflective sheet, a side surface of the plastic frame deviating from the reflective sheet is provided with a double-sided adhesive, at least one side frame of the plastic frame is provided with a groove, which is disposed at a side surface of the plastic frame opposite to the double-sided adhesive, and the groove passes through an internal side and an external side of the frame of the plastic frame and a side surface of the frame of the plastic frame opposite to the double-sided adhesive; the double-sided adhesive comprises a conductive heat dissipation layer for conducting static and dissipating heat and a double-sided adhesive layer disposed on both side surfaces of the conductive heat dissipation layer, and a first metal sheet is disposed on a double-sided adhesive layer opposite to the plastic frame, the first metal sheet corresponds to the position of the groove and contacts the optical diaphragm group and the conductive heat dissipation layer, respectively.

11. The liquid crystal display assembly of claim 10, wherein a protrusion part is disposed on an edge of the optical diaphragm group corresponding to the position of the groove, and the protrusion part is embedded into the groove.

12. The liquid crystal display assembly of claim 10, wherein a first hole is disposed on a double-sided adhesive layer opposite to the plastic frame which is at the first metal sheet, the first metal sheet is disposed in the first hole, an internal surface of the first metal sheet contacts the conductive heat dissipation layer, and a first exposed part is formed at an external surface of the first metal sheet and contacts the protrusion part.

13. The liquid crystal display assembly of claim 10, wherein a side of the double-sided adhesive at the light bar is provided with a widen part.

14. The liquid crystal display assembly of claim 13, wherein through holes are disposed on the widen part corresponding to the positions of lamp beads of the light bar, the light bar puts the light beads into the plastic frame via the through holes from a side surface of the double-sided adhesive deviating from the plastic frame, and a flexible circuit board of the light bar is fitted into a side surface of the widen part deviating from the plastic frame.

15. The liquid crystal display assembly of claim 14, wherein a second metal sheet is disposed on the double-sided adhesive layer deviating from the plastic frame, the second metal sheet is disposed on the widen part corresponding to the position of the flexible circuit board and contacts the conductive heat dissipation layer and the flexible circuit board, respectively.

16. The liquid crystal display assembly of claim 15, wherein a second hole is disposed on a double-sided adhesive layer deviating from the plastic frame which is at the second metal sheet, the second metal sheet is disposed in the second hole, an internal surface of the second metal sheet contacts the conductive heat dissipation layer, and a second exposed part is formed at an external surface of the second metal sheet and contacts the flexible circuit board.

17. The liquid crystal display assembly of claim 10, wherein the conductive heat dissipation layer is a graphite sheet.

18. The liquid crystal display assembly of claim 16, wherein the first metal sheet and the second metal sheet are copper foil.

* * * * *